Patented Aug. 31, 1943

2,327,984

UNITED STATES PATENT OFFICE 2,327,984

PRODUCTION OF LOW VISCOSITY UREA-FORMALDEHYDE ALCOHOL RESIN SOLUTIONS

Herbert J. West, Stamford, Conn., assignor to American Cyanamid Company, New York, N. Y., a corporation of Maine No Drawing. Application August 3, 1940, Serial No. 351,215

5 Claims. (Cl. 260—29)

This invention relates to urea-formaldehyde compositions having a low viscosity and being alkylated with aliphatic alcohols containing 8 or more carbon atoms, such compositions being useful as lacquers, etc.

An object of the present invention is to provide a process for obtaining clear low viscosity lacquers containing urea-formaldehyde condensation products alkylated and/or reacted with high molecular weight alcohols which are substantially insoluble in water.

Another object of this invention is to provide a process for the production of urea-formaldehyde lacquers suitable for use in roller coating, printing inks, etc.

Still another object of this invention is to provide urea-formaldehyde lacquer compositions having a high degree of compatibility with petroleum thinners, fatty oils, such as linseed oil, varnishes, long oil alkyd resins and other compositions which are not highly polar.

These and other objects are attained by reacting formaldehyde with urea and with a high molecular weight aliphatic alcohol containing at least 8 carbon atoms in the presence of a primary aliphatic alcohol completely miscible with water. It is preferable that sufficient alcohol be present to produce a homogeneous solution of formaldehyde, urea and the high molecular weight alcohol.

The following examples in which the proportions are in parts by weight are given by way of illustration and not in limitation.

Example 1

| | Parts |
|---|---|
| Urea (1 mol) | 60 |
| Formalin (37% formaldehyde in water) (2.3 mols) | 186 |
| Phosphoric acid | 0.6 |
| 2-ethyl hexanol | 120–180 |
| Methanol | 60–90 |

A mixture of the urea, formalin, acid, about one half of the 2-ethyl hexanol and the methanol is placed in a still provided with an agitator, and it is heated to the boiling point. The quantity of methanol used is adjusted so that a clear homogeneous solution is obtained at the boiling point. The mixture is maintained at the boiling point and wet methanol (i. e., methanol and water) is distilled off while dry methanol is gradually added at about the same rate as the methanol is distilled off. When the specific gravity of the distillate indicates that it is substantially dry methanol the addition of methanol is stopped and the balance of the 2-ethyl hexanol is added. The distillation is continued until the boiling point reaches about 100° C. When a vacuum is applied and gradually increased to 26 inches of mercury vacuum (approximately 3–4 inches of mercury absolute pressure). This distillation proceeds at about 90° C. gradually rising to about 100° C. toward the end of the distillation at which time only about 1–2% of methanol remains. The product is a clear, pale-colored lacquer containing about 50–60% solids. The viscosity of the 50% solution is between about Z–1 and Z–2 (Gardner Holdt). It is miscible with at least 15 times its volume of mineral spirits (Sunoco spirits).

Example 2

| | Parts |
|---|---|
| Urea (1 mol) | 60 |
| Formalin (37% formaldehyde in water) (2.3 mols) | 186 |
| Phosphoric acid | 0.6 |
| Butyl carbitol | 120–180 |
| Methanol | 60–90 |

The procedure of Example 1 is repeated substituting the butyl carbitol (the monobutyl ether of diethylene glycol) for the 2-ethyl hexanol. A product is obtained which has a viscosity of about Z (Gardner Holdt) at a concentration of about 54% solids. It is particularly suitable for use in printing ink applications.

Example 3

| | Parts |
|---|---|
| The resin solution of Example 1 (50% solids) | 20 |
| Soya-bean oil modified phthalic-glyceride resin (40% phthalic glyceride) (50% resin in mineral spirits) | 80 |
| Titanium dioxide | 47.5 |
| Zinc oxide | 2.5 |

The above ingredients are ground, for example in a ball mill or roller mill and thinned with mineral spirits to the desired consistency for application by roll coating, spraying or dipping. Films of this composition may be baked at about 250° F.–350° F. for from 2 hours to ten minutes depending on the temperature. The enamel films obtained are hard, scratch-resistant and show little tendency to yellow.

Other water-miscible primary aliphatic alcohols or mixtures thereof may be substituted for part or all of the methanol used in the above examples, e. g., ethanol, n-propanol, etc.

In place of part or all of the higher alcohols used in the above examples I may substitute other high molecular weight aliphatic alcohols (or mixtures thereof) containing at least 8 carbon atoms, e. g., capryl alcohol, pine oil, lauryl alcohol, decanol, etc. My process is also suitable for the alkylation of urea-formaldehyde resins with other alcohols, e. g., butyl Cellosolve (the monobutyl ether of ethylene glycol). In some instances I have found, as for example with lauryl alcohol, that perfectly fluid products are generally only obtained while the solution is hot. This may be overcome, however, by incorporating 10-50% of benzyl alcohol, ethyl Cellosolve, or the like into the solutions, or in some instances by reducing the solids content with the higher alcohol used for the alkylation.

The ratio of formaldehyde to urea may be varied considerably but it is preferable that the ratio be between about 2.3:1 and 2.5:1.

Other aldehydes or substances which yield formaldehyde may be substituted for part or all of the formaldehyde used in the above examples, e. g., trioxymethylene, paraformaldehyde, etc.

The wet methanol (or other water-miscible alcohol) which is removed by distillation from the reaction mixture as described in the above examples may be rectified and the dry methanol returned to the reaction mixture. Accordingly the use of methanol in the process need not cause more than a very little loss of this material.

The proportion of the high molecular weight alcohol may be varied considerably, e. g., from about 1-3 parts of alcohol per part of urea. The proportion used is usually adjusted to give the desired solids:liquid ratio in the product. The proportion of methanol (or other water-miscible alcohol) which is used initially should be sufficient to provide a clear, homogeneous solution and if desired considerable excess may be employed.

The water-miscible alcohol such as methanol may be added continuously or periodically in small batches. The rate of addition should be kept about equal to or slightly greater than the rate at which the wet alcohol distills off.

Urea-formaldehyde resin lacquers produced according to this invention have a high degree of compatibility with petroleum thinners, fatty oils, especially the drying oils, drying oil varnishes, long oil modified alkyd resins, etc. They are also more compatible with cellulose esters and cellulose ethers than urea-formaldehyde resin lacquers alkylated with lower alcohols such as butyl alcohol. My products are compatible with nitrocellulose, as well as with many other film forming materials.

Products made according to my invention are especially useful in those applications wherein compatibility with any of the substances mentioned above is necessary or desired. They are also particularly useful in applications where a relatively non-volatile solvent is desired. Among the uses which I have found that my products are particularly applicable to are the production of roller coating enamels, the production of printing inks, the production of lithographic inks, etc. My lacquers are also useful when suitably thinned in the production of various coating compositions for widespread applications. In coating compositions I have found that it is usually desirable to blend my urea-formaldehyde resin lacquers with oil modified alkyd resins, preferably in the ratio of about 1 part of urea-formaldehyde resin lacquer to 1-4 parts of alkyd resin. Various pigments, dyes, fillers, etc., may be mixed with my compositions as, for instance, in the manufacture of paints, enamels, etc.

Obviously many modifications and variations in the processes and compositions described above may be made without departing from the spirit and scope of the invention as defined in the appended claims.

I claim:

1. The process which comprises reacting urea and aqueous formaldehyde with about one half of the desired proportion of a high molecular weight aliphatic alcohol, having not more than one hydroxyl group and containing at least 8 carbon atoms, in the presence of sufficient water-miscible primary aliphatic alcohol containing from 1 to 3 carbon atoms and having not more than one hydroxyl group to produce a clear homogenous solution before reaction, distilling off said water-miscible alcohol wet with water, continuing the distillation of such wet water-miscible alcohol until substantially no water is present, adding dry, water-miscible monohydric alcohol containing from 1 to 3 carbon atoms at substantially the same rate as it is distilled off, adding a second proportion of the high molecular weight aliphatic alcohol, approximately equal to that originally added, and removing the water-miscible alcohol by distillation, the entire process being carried out under acid conditions.

2. A process which comprises reacting urea and aqueous formaldehyde with a portion of a high molecular weight aliphatic alcohol having not more than one hydroxyl group and containing at least 8 carbon atoms in the presence of sufficient water-miscible primary aliphatic alcohol containing from 1 to 3 carbon atoms and having not more than one hydroxyl group to produce a clear homogeneous solution before reaction, distilling off said water-miscible alcohol wet with water, continuing the distillation of such wet water-miscible alcohol until substantially no water is present, adding dry water-miscible monohydric alcohol containing from 1 to 3 carbon atoms at substantially the same rate as it is distilled off, adding a second portion of a high molecular weight aliphatic alcohol having not more than one hydroxyl group and containing at least 8 carbon atoms and removing the water-miscible alcohol by distillation, the entire process being carried out under acid conditions.

3. A process which comprises reacting urea and aqueous formaldehyde with a portion of a high molecular weight aliphatic alcohol having not more than one hydroxyl group and containing at least 8 carbon atoms in the presence of sufficient methanol to produce a clear homogeneous solution before reaction, distilling off wet methanol, continuing the distillation of the wet methanol until substantially no water is present, adding dry methanol at substantially the same rate as it is distilled off, adding a second portion of a high molecular weight aliphatic alcohol having not more than one hydroxyl group and containing at least 8 carbon atoms and removing the methanol by distillation, the entire process being carried out under acid conditions.

4. A process which comprises reacting urea and aqueous formaldehyde with a portion of an octanol in the presence of sufficient methanol to produce a clear, homogeneous solution before reaction, distilling off wet methanol while adding dry methanol at substantially the same rate as it is distilled off, continuing the distillation of the wet methanol until substantially no water is present, adding a second portion of an octanol and removing the methanol by distillation, the entire process being carried out under acid conditions.

5. A process which comprises reacting urea and aqueous formaldehyde with a portion of 2-ethyl hexanol in the presence of sufficient methanol to produce a clear homogeneous solution before reaction, distilling off wet methanol while adding dry methanol at substantially the same rate as it is distilled off, continuing the distillation of the wet methanol until substantially no water is present, adding a second portion of 2-ethyl hexanol, and removing the methanol by distillation, the entire process being carried out under acid conditions.

HERBERT J. WEST.